UNITED STATES PATENT OFFICE.

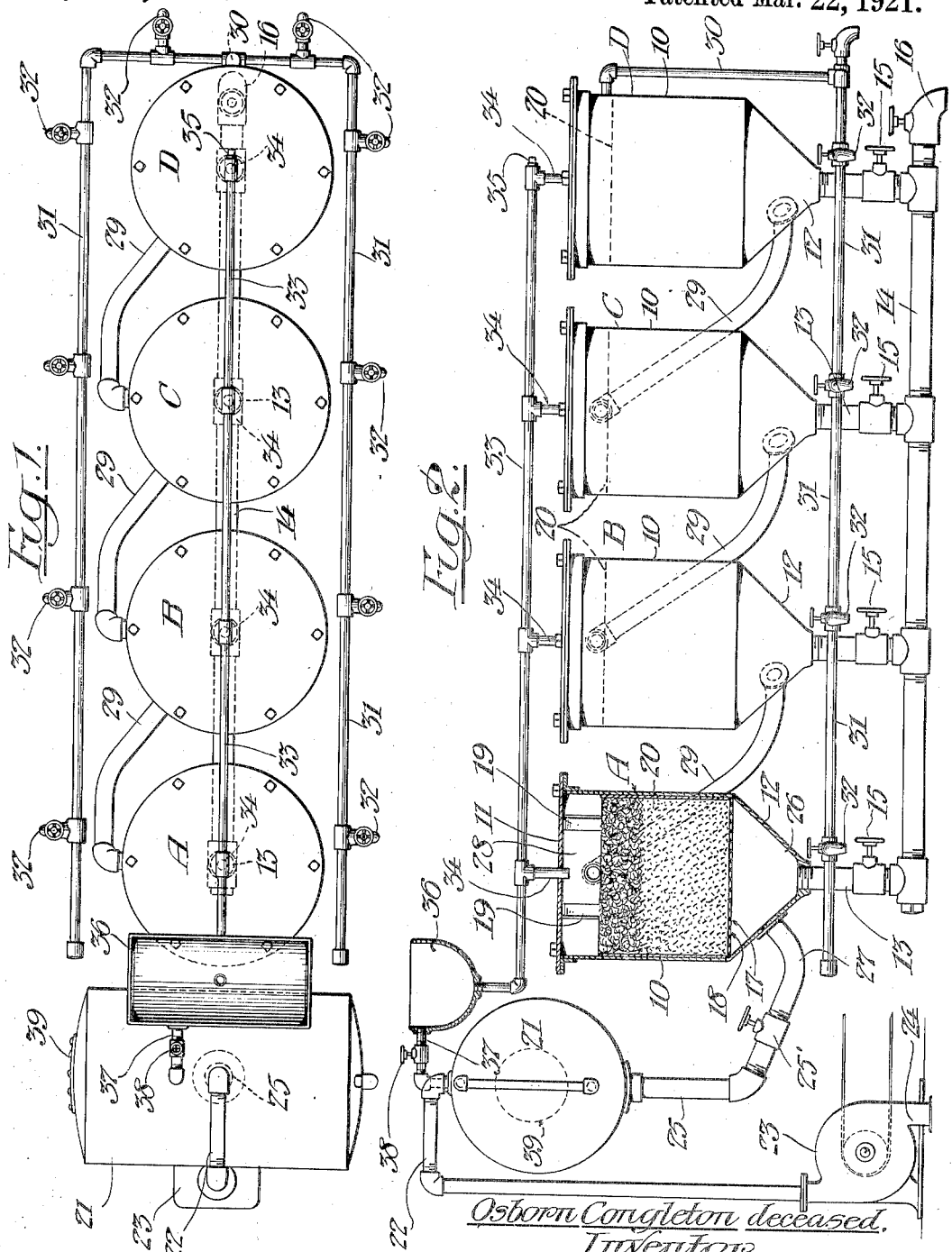

OSBORN CONGLETON, DECEASED, LATE OF NEW YORK, N. Y., BY JAMES TAYLOR LEWIS, EXECUTOR, OF YONKERS, NEW YORK.

FILTER APPARATUS.

1,372,119.  Specification of Letters Patent.  Patented Mar. 22, 1921.

Application filed April 4, 1918. Serial No. 226,738.

*To all whom it may concern:*

Be it known that OSBORN CONGLETON, deceased, late a citizen of the United States, and resident of the borough of Manhattan, in the city and county of New York, State of New York, did invent certain new and useful Improvements in Filter Apparatus, of which the following is a specification.

This invention relates to filter apparatus; and it has for its object to provide a series flow apparatus of simple and efficient construction and operation whereby a large volume of water can be rapidly filtered for drinking or other purposes.

A further object of the invention is to provide such a filter which can be readily and thoroughly cleansed, and, if desired, sterilized, from time to time as need may require.

A still further object of the invention is to provide such a filter which can be transported with facility from place to place and operatively connected with any convenient source of water supply.

With these and other objects in view the invention comprises various novel features of construction and combinations of parts which will be hereinafter described and claimed.

In the drawings—

Figure 1 is a plan of a filter embodying the preferred form of the invention.

Fig. 2 is a front elevation thereof, partly in section.

Referring to the drawings, A, B, C, and D designate a series of filtering tanks arranged in spaced relation to each other as shown. In the present instance there are four tanks in the series, but the number may be increased or reduced without departure from the invention. Each tank comprises a cylindrical shell 10 having a removable head 11 and a tapering bottom portion 12, the latter having a central pipe connection 13 with a common pipe 14 underlying the series of tanks. The connection 13 is provided with a suitable valve 15, whereby communication between the lower portion of the filtering tank and the pipe 14 can be opened or closed at will. That end of the pipe 14 adjacent the first tank A is closed, and the opposite end is provided with a faucet 16 whereby the pipe may be opened or closed as desired.

Within each filtering tank is removably supported a cylindrical open-top receptacle 17 having a foraminated bottom 18. The receptacle rests upon the upper edges of the tapering bottom 12 and rises nearly to the head of the tank; the upper edge of the receptacle having up-standing handles 19 upon which the head 11 of the tank bears and thus holds the receptacle firmly within the tank. Each receptacle contains filtering material, 20, of any suitable character; the filtering material in the succeeding tanks being preferably of different quality and size so as to effect progressive filtration of the water during its passage therethrough as hereinafter described.

Adjacent to the first tank A of the series is an elevated horizontally-disposed tank 21, termed a pressure tank, into the top of which leads the upper end of a vertical feed pipe 22 having its lower end connected with the discharge orifice of a rotary pump 23. This pump is provided with an ingress portion 24 adapted to be operatively connected with any convenient source of water supply, whereby during the operation of the pump the water is drawn from such source and delivered under pressure into the interior of the elevated tank 21. The bottom of this tank 21 is connected by means of a pipe 25 with the tapering lower chamber 26 of the first filtering tank; such pipe having an upwardly curved lower connection with the chamber, as indicated at 27, whereby the water from the tank 21 is delivered directly beneath and toward the bottom of the filtering material. The pipe 25 is provided with a suitable valve 25' whereby communication between the interior of the tank 21 and the chamber 26 can be opened or closed at will.

The space 28 above the filtering material in the first filtering tank is connected by means of a downwardly-inclined pipe 29 with the tapering lower chamber of the second filtering tank B; the space above the filtering material of the latter tank is connected by means of a similar pipe with the tapering lower chamber of the third filtering tank C, and the upper space of the latter tank is, in turn, similarly connected with the lower space of the fourth filtering tank D, all as clearly shown. If a greater number of filtering tanks be employed, a similarly inclined pipe connection between succeeding vessels will be provided.

The upper space 28 of the final filtering tank D is equipped with an outlet pipe 30 which depends to and is connected with a suitably-disposed distributing pipe 31 having faucets 32 at various intervals throughout its length.

Overlying the entire series of filtering tanks is a horizontal pipe 33 having depending branches 34 leading into the upper spaces 28 of the respective tanks. The end of the pipe 33 adjacent the final tank D is closed, as at 35, and the opposite end of such pipe is in communication with the interior of the elevated tank 21. Preferably the pipe 33 enters a bowl or open-top hopper 36 and the latter has an overflow connection 37 leading into the tank 21, which connection is provided with a valve 38 whereby communication between the tank 21 and the bowl 36 can be opened or closed at will.

Preparatory to the operation of the above described apparatus all the valves and faucets thereof are closed, and the inlet portion of the pump is connected by means of a flexible pipe or the like with a suitable source of water, as, for example, a convenient stream or other body of water. When such connection is established the pump is actuated, thereby delivering the water, under pressure, to the tank 21. When a predetermined volume of water has been supplied to this tank the operation of the pump is discontinued and the valve 25' is opened, whereupon the water flows, by force of gravity, down to the basal chamber of the first filtering tank A; thence up against and through the filtering material within the tank A; thence, upon reaching the level defined by the inlet of the pipe 29, entering said pipe and passing therethrough to the basal chamber of the second filtering tank B; thence flowing likewise through the entire series of tanks and their pipe connections 29. When the water finally reaches the upper chamber of the tank D, the water has been and is effectively filtered. The filtered water enters the pipe 30 and flows thence to the pipe 31 from which it may be drawn through any or all of the distributed faucets as required. If desired the passage of the water through the filtering tanks may be accelerated by operating the pump.

By the construction and arrangement above described clogging or fouling of the filtering material is prevented for the reason that the greater part of the solids suspended in the water are precipitated into the pipes 13 in the tapering bottoms of the tanks, before such solids have an opportunity to reach the graduated filtering material of the respective tanks. By opening the valves 15 of these pipes 13, and the faucet 16 at the end of the pipe 14, the accumulations in the bottoms of the filtering tanks will pass into the pipe 13 and be discharged therefrom at the faucet, the head of water from the elevated tank insuring an effective clearing and flushing of the pipes. Again by closing the valve 25' of the pipe 25, (when the valves 15 are open) and opening the valve 38 of the connection 37 the water from the pressure tank will be forced, by actuation of the pump, through the said connection into the bowl 36 and through the pipe 33, whence it will flow through the branches 34 into the tops of the respective filtering tanks. The water thus entering these tanks will flow through the pipes 29 and also through the filtering material, thus flushing the upper and lower chambers of the tanks and also the pipes 13 and 14, the water and the accumulations being discharged through the open faucet 16. In this way the entire system will be thoroughly flushed, cleansed and aerated with the water from the pressure tank. This flushing and cleansing arrangement is an important feature of the invention.

To facilitate the cleansing of the pressure tank one end of the latter is provided with a suitable manhole and cover therefor 39.

It is obvious that by introducing a suitable sterilizing medium into the bowl 36 such medium will be rapidly distributed throughout the filtering tanks and their appurtenances during the cleansing operation above described.

The improved apparatus has been especially designed for army field service; and therefore the construction is such that it can be effectively mounted upon an automobile truck and thereby readily transported from place to place; suitable operative connections, in that case, being provided between the pump and the main shaft of the truck motor.

It is to be understood that the apparatus herein shown and described may be modified in various respects without departing from the principle of the invention as defined in the appended claims.

What is claimed is—

1. An apparatus of the character described comprising a filtering tank having an upper chamber and a tapering basal chamber and filtering material interposed between said chambers, a valved outlet connection for said basal chamber, an outlet connection for the upper chamber, a supply tank, and a connection between said supply tank and the basal chamber, said latter connection having an upwardly inclined portion entering the tapering wall of the basal chamber.

2. An apparatus of the character described comprising a filtering tank having upper and basal chambers and filtering material interposed between said chambers, a valved outlet connection for the basal chamber, an outlet connection for the upper chamber, a pressure tank, a pump for supplying water thereto under pressure, a valved connection between said pressure tank and said basal chamber, and a valved connection between the pressure tank and the upper chamber of the filtering tank, said latter connection including a liquid receptacle.

3. An apparatus of the character described comprising a series of filtering tanks, each having upper and basal chambers and filtering material interposed between said chambers, a pipe below said tanks, valved connections between said basal chambers and the pipe, a pressure tank, means for supplying water thereto under pressure, a valved connection between said pressure tank and the basal chamber of the first filtering tank, pipe connections between the upper and lower chambers of the succeeding filtering tanks, an outlet pipe for the upper chamber of the final filtering tank, connections, including a liquid receptacle, between the pressure tank and the upper chambers of the respective filtering tanks.

JAMES TAYLOR LEWIS,
*Executor estate of Osborn Congleton, deceased.*